United States Patent
Ozeki et al.

(10) Patent No.: US 12,397,710 B2
(45) Date of Patent: *Aug. 26, 2025

(54) DISPLAY SYSTEM AND DISPLAY DEVICE

(71) Applicant: Panasonic Automotive Systems Co., Ltd., Kanagawa (JP)

(72) Inventors: Akinori Ozeki, Kanagawa Ken (JP); Osamu Takeyasu, Kanagawa Ken (JP); Ryuko Arisawa, Kanagawa Ken (JP); Takayuki Hirano, Kanagawa Ken (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/758,429

(22) Filed: Jun. 28, 2024

(65) Prior Publication Data

US 2024/0351525 A1 Oct. 24, 2024

Related U.S. Application Data

(63) Continuation of application No. 18/243,852, filed on Sep. 8, 2023, now Pat. No. 12,054,099, which is a
(Continued)

(30) Foreign Application Priority Data

Mar. 29, 2019 (JP) .................. 2019-068098
Mar. 29, 2019 (JP) .................. 2019-068191
(Continued)

(51) Int. Cl.
*B60R 1/26* (2022.01)
*B60K 35/00* (2024.01)
(Continued)

(52) U.S. Cl.
CPC ............... *B60R 1/26* (2022.01); *B60K 35/00* (2013.01); *B60R 1/04* (2013.01); *B60R 1/12* (2013.01);
(Continued)

(58) Field of Classification Search
CPC .... B60R 1/26; B60R 1/04; B60R 1/12; B60R 2001/1215; B60R 2300/8046;
(Continued)

(56) References Cited

U.S. PATENT DOCUMENTS 7,453,057 B2 11/2008 Drummond et al.
7,541,570 B2 6/2009 Drummond et al.
(Continued)

FOREIGN PATENT DOCUMENTS

JP 2018-043643 3/2018

*Primary Examiner* — Farzana Hossain
(74) *Attorney, Agent, or Firm* — GREENBLUM & BERNSTEIN, P.L.C.

(57) ABSTRACT

A display device includes a housing, an electro-optic layer, a display to display at least a portion of a rearward image, and an actuator to switch the electro-optic layer between first and second postures. In the first posture, the display displays the portion of the rearward image. In the second posture, the reflectivity of the incident light varies between at least first and second values based on at least one of a first illuminance or a second illuminance, and the second value is larger than the first value. In the first posture, the reflectivity of the incident light is equal to or more than the second value. The first illuminance indicates brightness around a vehicle and is detected by a sensor. The second illuminance indicates intensity of light emitted on a front surface of the display device and is detected by another sensor.

20 Claims, 8 Drawing Sheets

Related U.S. Application Data continuation of application No. 17/965,362, filed on Oct. 13, 2022, now Pat. No. 11,787,341, which is a continuation of application No. 17/243,204, filed on Apr. 28, 2021, now Pat. No. 11,501,737, which is a continuation of application No. 16/825,088, filed on Mar. 20, 2020, now Pat. No. 11,024,261.

(30) Foreign Application Priority Data

| | | |
|---|---|---|
| Mar. 29, 2019 | (JP) | 2019-068745 |
| Jan. 9, 2020 | (JP) | 2020-002211 |

(51) Int. Cl.

| | |
|---|---|
| *B60K 35/60* | (2024.01) |
| *B60K 35/81* | (2024.01) |
| *B60R 1/04* | (2006.01) |
| *B60R 1/12* | (2006.01) |
| *G09G 5/10* | (2006.01) |

(52) U.S. Cl.
CPC ............... *G09G 5/10* (2013.01); *B60K 35/60* (2024.01); *B60K 35/81* (2024.01); *B60K 2360/21* (2024.01); *B60K 2360/349* (2024.01); *B60K 2360/779* (2024.01); *B60R 2001/1215* (2013.01); *B60R 2300/8046* (2013.01); *G09G 2320/0633* (2013.01); *G09G 2360/144* (2013.01); *G09G 2380/10* (2013.01)

(58) Field of Classification Search
CPC ........ B60K 35/00; B60K 35/60; B60K 35/81; B60K 2360/21; B60K 2360/349; B60K 2360/779; B60K 35/658; B60K 35/415; B60K 2360/1523; B60K 2360/176; B60K 35/22; B60K 35/28; B60K 35/50; G09G 5/10; G09G 2320/0633; G09G 2360/144; G09G 2380/10; G09G 3/36
See application file for complete search history.

(56) References Cited

U.S. PATENT DOCUMENTS

| | | | |
|---|---|---|---|
| 9,827,908 | B2 | 11/2017 | Konuki |
| 9,834,146 | B2 | 12/2017 | Vanderploeg et al. |
| 10,059,264 | B2 | 8/2018 | Kato |
| 11,024,261 | B2 | 6/2021 | Ozeki |
| 11,501,737 | B2 | 11/2022 | Ozeki |
| 11,787,341 | B2 | 10/2023 | Ozeki |
| 12,054,099 | B2 * | 8/2024 | Ozeki ............... B60K 35/00 |
| 2009/0096937 | A1 | 4/2009 | Bauer |
| 2017/0313252 | A1 | 11/2017 | Uchimura et al. |
| 2018/0222319 | A1 | 8/2018 | Fujisaki et al. |
| 2018/0222320 | A1 | 8/2018 | Kochiya |

* cited by examiner

| FIRST SENSOR VALUE | SECOND SENSOR VALUE | BRIGHTNESS |
|---|---|---|
| LOW | HIGH | LOW |
| | LOW | MEDIUM |
| HIGH | HIGH | MEDIUM |
| | LOW | HIGH |

| FIRST SENSOR VALUE | SECOND SENSOR VALUE | TRANSMITTANCE |
|---|---|---|
| LOW | HIGH | HIGH |
| | LOW | MEDIUM |
| HIGH | HIGH | MEDIUM |
| | LOW | LOW |

DISPLAY SYSTEM AND DISPLAY DEVICE

CROSS-REFERENCE TO RELATED APPLICATIONS

This application is a Continuation of U.S. patent application Ser. No. 18/243,852, filed Sep. 8, 2023, which is a Continuation of U.S. patent application Ser. No. 17/965,362, filed Oct. 13, 2022, now U.S. Pat. No. 11,787,341 issued Oct. 17, 2023, which is a Continuation of U.S. patent application Ser. No. 17/243,204, filed Apr. 28, 2021, now U.S. Pat. No. 11,501,737 issued Nov. 15, 2022, which is a Continuation of U.S. patent application Ser. No. 16/825,088, filed on Mar. 20, 2020, now U.S. Pat. No. 11,024,261 issued Jun. 1, 2021, which claims the benefit of Japanese Patent Applications No. 2019-068098, No. 2019-068191 and No. 2019-068745, each filed on Mar. 29, 2019, and Japanese Patent Application No. 2020-002211, filed on Jan. 9, 2020. The disclosure of each of these documents, including the specification, drawings, and claims, is incorporated herein by reference in its entirety.

FIELD

Embodiments described herein relate generally to a display system and a display device and relate in particular to a display system and a display device that display captured images rearward of the vehicle.

BACKGROUND

In recent years, instead of commonly used inner rear-view mirrors, the utilization of a display system and a related display device that capture images rearward of the vehicle by way of an image capture device and display the captured images on a display device are being evaluated (Japanese Patent Application Laid-open No. 2018-43643).

However, the above described display systems and display devices require evaluation of further improvements towards achieving practical usage.

SUMMARY

To resolve the aforementioned issues, one aspect of the display system is a display system that is placeable in the vehicle and includes an image capture device that captures images rearward of the vehicle, a display device that is coupled to the image capture device via a network, and receives at least a portion of the rearward images captured by the image capture device, a first illuminance sensor that detects brightness around the vehicle, and a second illuminance sensor that detects intensity of light emitted onto a front surface of the display device. The display device includes a housing with an opening on a front side, an electro-optic layer with a transmissive-reflective layer that transmits a portion of incident light and reflects another portion of the incident light, the electro-optic layer being configured to vary reflectivity of the incident light, a display placed on a rear side of the electro-optic layer and configured to display at least a portion of the rearward images, a control circuit that controls operation of the display device, and an actuator placed in the housing and configured to switch a posture of the electro-optic layer between a first posture and a second posture. The first posture is a posture that a driver of the vehicle views rearward of the vehicle by at least a portion of the rearward images displayed on the display. The second posture is a posture that the driver of the vehicle views rearward of the vehicle by way of a mirror image that appears on the transmissive-reflective layer. The control circuit controls the display to display at least a portion of the rearward images when the posture of the electro-optic layer is in the first posture, controls the display to display no image when the posture of the electro-optic layer is in the second posture, and controls brightness of the display device based on a value detected by at least one of the first illuminance sensor and the second illuminance sensor. The display is visible to the driver through the electro-optic layer when the control circuit controls the display to display at least a portion of the rearward images.

Another aspect of the present disclosure is a display device that is placeable within interior of the vehicle and that includes a housing with an opening on a front side, an image acquirer that acquires images rearward of the vehicle, a first illuminance detector that detects a first illuminance indicating brightness around the vehicle, and a second illuminance detector that detects a second illuminance indicating intensity of light emitted on a front surface of the display device. The display device includes an electro-optic layer with a transmissive-reflective layer that transmits a portion of incident light and reflects another portion of the incident light, the electro-optic layer being configured to vary reflectivity of the incident light, a display placed on a rear side of the electro-optic layer and configured to display at least a portion of the rearward images, a control circuit that controls operation of the display device, and an actuator placed in the housing and configured to switch a posture of the electro-optic layer between a first posture and a second posture. The first posture is a posture that the driver of the vehicle views the rearward of the vehicle by at least a portion of the rearward images displayed on the display. The second posture is a posture that the driver of the vehicle views the rearward of the vehicle by way of a mirror image that appears on the transmissive-reflective layer. The control circuit controls the display to display at least of a portion of the rearward images when the posture of the electro-optic layer is in the first posture, controls the display to display no image when the posture of the electro-optic layer is in the second posture, and controls brightness of the display based on a value detected by at least one of the first illuminance and the second illuminance. The display is visible to the driver of the vehicle through the electro-optic layer when the control circuit controls the display to display at least a portion of the rearward images.

An optimal combination of the above structural elements, methods expressing the present disclosure devices, systems, etc. are also valid in the present disclosure.

DETAILED DESCRIPTION

Knowledge Basic to the Present Disclosure

Figure 1:
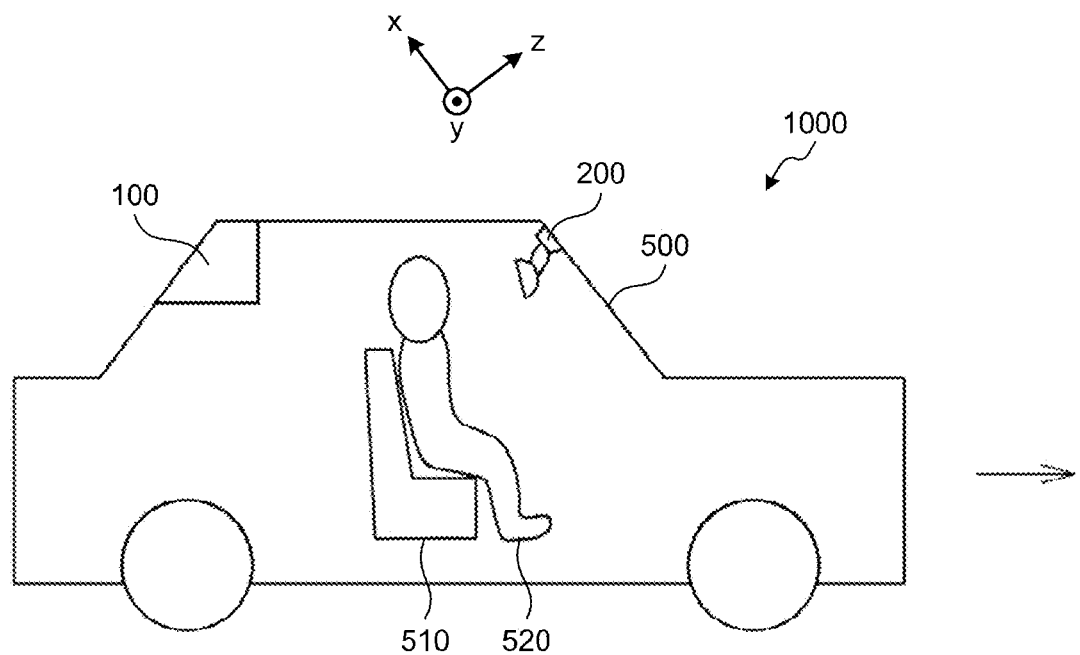
FIG. 1 is a drawing illustrating the structure of the vehicle relating to one aspect of an embodiment of the present disclosure.

Basic knowledge is described prior to giving a specific description of the embodiments. Display systems for capturing images rearward of the vehicle by utilizing an image capture device and displaying the captured images on a display device for confirmation by the driver have been conventionally evaluated in the art. One-way mirrors, placed on the front surface of the display device, that switch between the following two modes are also being evaluated. One mode is a mode that can be visually recognized by the driver as a video that transmits through the one-way mirror when the video is displayed on the display device. The other mode is a mode that allows the driver to visually recognize the rearward of the vehicle by a mirror image reflected in the one-way mirror when not displaying a video on the display device. On the other hand, on vehicle inner rear-view mirrors such as utilizing one-way mirrors, the provision of a layer on the surface of the rear-view mirror that changes the reflectivity by the application of a voltage is being evaluated. Moreover, technology is also being evaluated that reduces the glare reflecting to the rear-view mirror due for example to the high beams from the headlights of a rearward vehicle that causes the driver to feel a blinding glare. This technology is also called automatic anti-glare technology.

However, the present inventors perceived the fact that in the above described display device or display system, the problem occurs that visual recognition of the video or image displayed on the display device worsens due to changes in the surrounding environment such as fluctuations in the brightness around the vehicle. The present inventors also perceived that in the case of a display device or a display system that a one-way mirror is placed on the front surface of the above described display device, and when the above described anti-glare technology is simply utilized with the one-way mirror, the anti-glare technology sometimes operates even when the display device is displaying a video, and causes the problem that the driver finds it difficult to view and identify the video. Various shapes are being evaluated for the display viewed by the driver to improve the design on the above described display device. For example, the contour of the display need not be limited to a rectangular shape and a portion of the display may be a curve shape. The inventors further perceived the problem that in this type of display device problems can occur when the video or image acquired by the display device is displayed as is on the display device without changes. Moreover in recent years, in vehicles with names such as what is called "connected cars", the accessory devices within the vehicle are sometimes mutually carrying out communication. The inventors perceived that when these respective accessory devices are separately operated such as by using the operating buttons placed on them, the resultant operation disturbs the driver's concentration. To resolve at least one of these issues, the present inventors configured a display system or display device relating to the present disclosure as given below.

In each of the accompanying work drawings, the same reference numerals are assigned to identical structural elements, members and processes, and redundant descriptions are omitted. The dimensions of the members in each work drawing are enlarged or reduced for purposes of convenience to simplify the description.

First Embodiment

FIG. 1 is a drawing illustrating the structure of a vehicle 1000 relating to an embodiment of the present disclosure. The right side of FIG. 1 is here equivalent to the front side of the vehicle 1000. In other words, the vehicle 1000 is driving rightward of FIG. 1. The vehicle 1000 illustrated in FIG. 1 includes an image capture device 100, a display device 200, a windshield 500, and a seat 510. The x axis, y axis, and z axis as illustrated in FIG. 1 are assumed to utilize Cartesian coordinates. The x axis extends along the windshield 500 and therefore includes a tilt angle identical to the tilt angle of the windshield 500. The y axis intersects the x axis and extends to the left and right of the vehicle 1000. The x-y plane therefore matches the surface of the windshield 500. The z axis is perpendicular to the x axis and y axis and extends along the normal direction of the windshield 500. The positive (or forward) directions of the x axis, y axis, and z axis are illustrated by the direction of respective arrows in FIG. 1 and the negative (or rear) directions are a direction opposite the arrows.

The positive (or forward) direction of the x axis is an upward direction toward the rear of the vehicle 1000 along the windshield 500. The negative (or rear) direction of the x axis is a direction toward the front of the vehicle 1000 along the windshield 500. The positive (or forward) direction of the z axis is the normal direction toward the front of the vehicle 1000 from the windshield 500. The negative (or rear) direction of the z axis is the normal direction toward the rear of the vehicle 1000 from the windshield 500. Hereafter, the positive direction of the x axis is also sometimes called, "rearward" or "rear side", the negative direction of the x axis is the "forward" or "front side", the positive direction of the y axis is the "leftward" or "left side", the negative direction of the y axis is the "rightward" or "right side", the positive direction of the z axis is the "upward" or "upper side", the negative direction of the z axis is the "downward" or "lower side". Here, the rearward and forward of the x axis are different from the rearward and forward of the vehicle 1000;

the upward and downward of the z axis are different from the upward and downward of the vehicle 1000, however these are sometimes used without clearly distinguishing between them.

The image capture device 100 is placed at the rear of the vehicle 1000 and captures images rearward of the vehicle 1000. The image capture device 100 may also be coupled to the display device 200 via an electronic control unit (ECU) not illustrated in the drawing. In other words, the image capture device 100 may be coupled to the display device 200 via a network. These types of couplings are usable for wireless communication, cable communications or any combination of these communication methods. The image capture device 100 may also be coupled directly to the display device 200. The image capture device 100 outputs the captured video or images to the display device 200. Here, the image capture device 100 and the display device 200 are included in a display system 1 of the present disclosure.

The display device 200 may be placed on the windshield 500 within the vehicle 1000. The display device 200 may for example be placed in the center section along the left-right direction of the windshield 500. The seat 510 is placed at a position to the rear of the vehicle 1000 from the display device 200 and a vehicle occupant 520 sits in the seat 510. When the seat 510 is the driver's seat then the vehicle occupant 520 is equivalent to the driver. The display device 200 receives video or images input from the image capture device 100 and display the video to the vehicle occupant 520. The display device 200 in other words displays video or images within the vehicle 1000.

Figure 2:
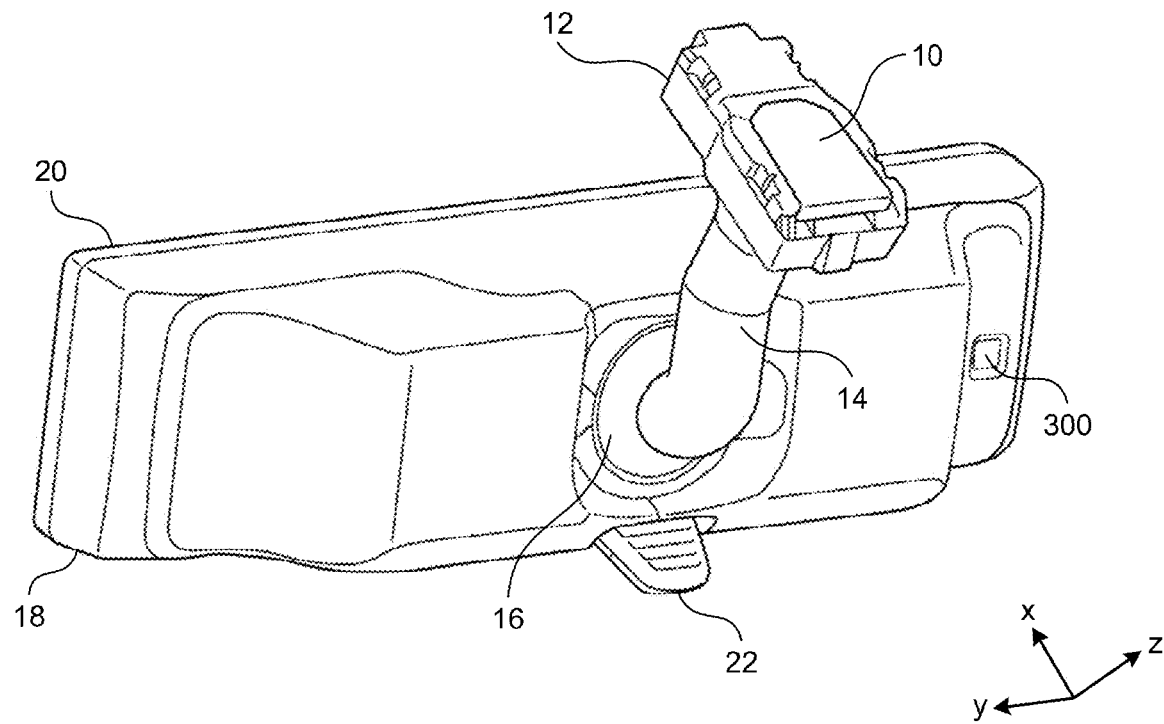
FIG. 2 is a perspective view illustrating the structure of the display device relating to one aspect of the first embodiment of the present disclosure.
Figure 3:
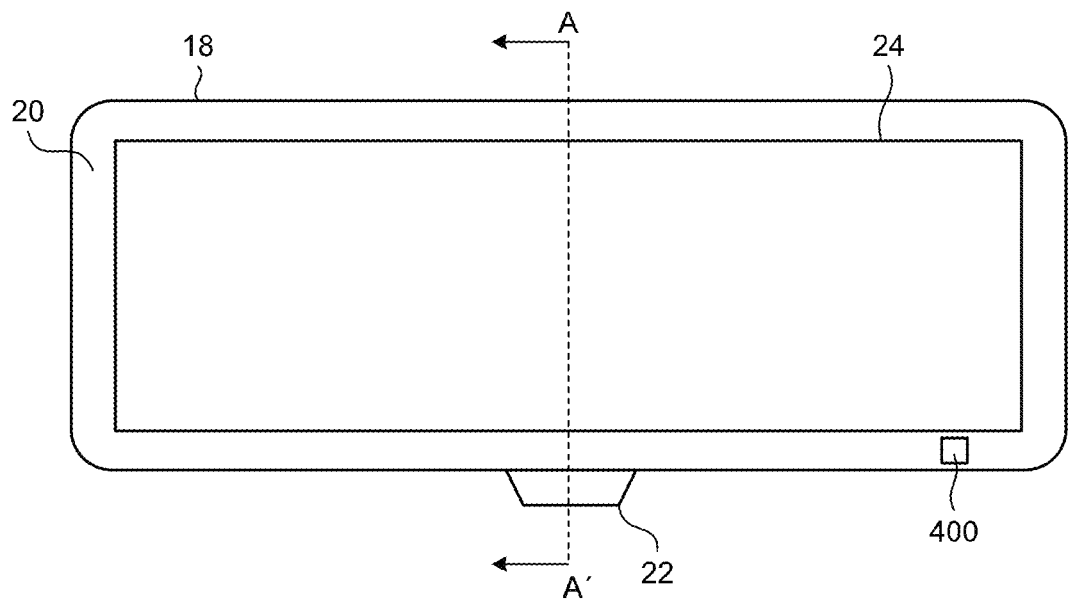
FIG. 3 is a frontal view illustrating the overall structure of the display device relating to one aspect of the first embodiment of the present disclosure.
Figure 4:
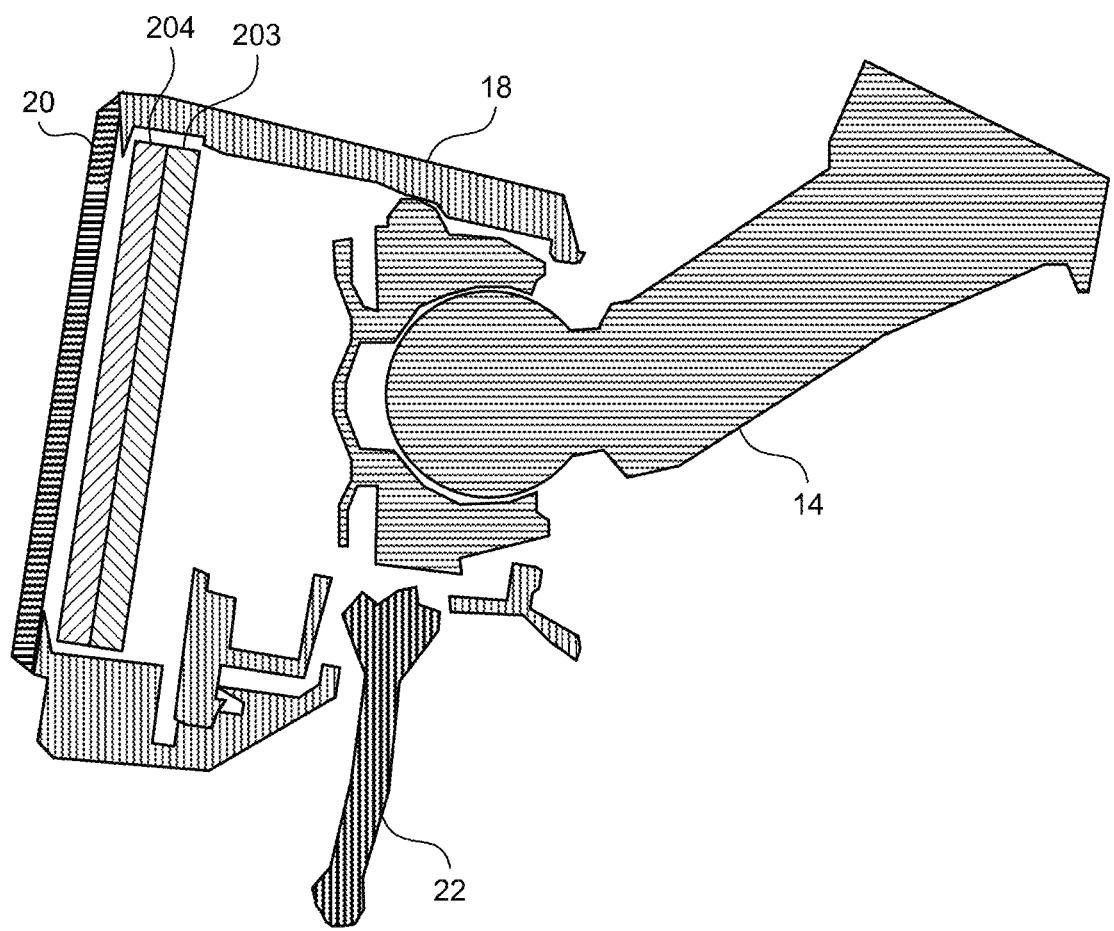
FIG. 4 is a cross-sectional view illustrating the structure when the display device of one aspect of the first embodiment of the present disclosure is in the first posture.
Figure 5:
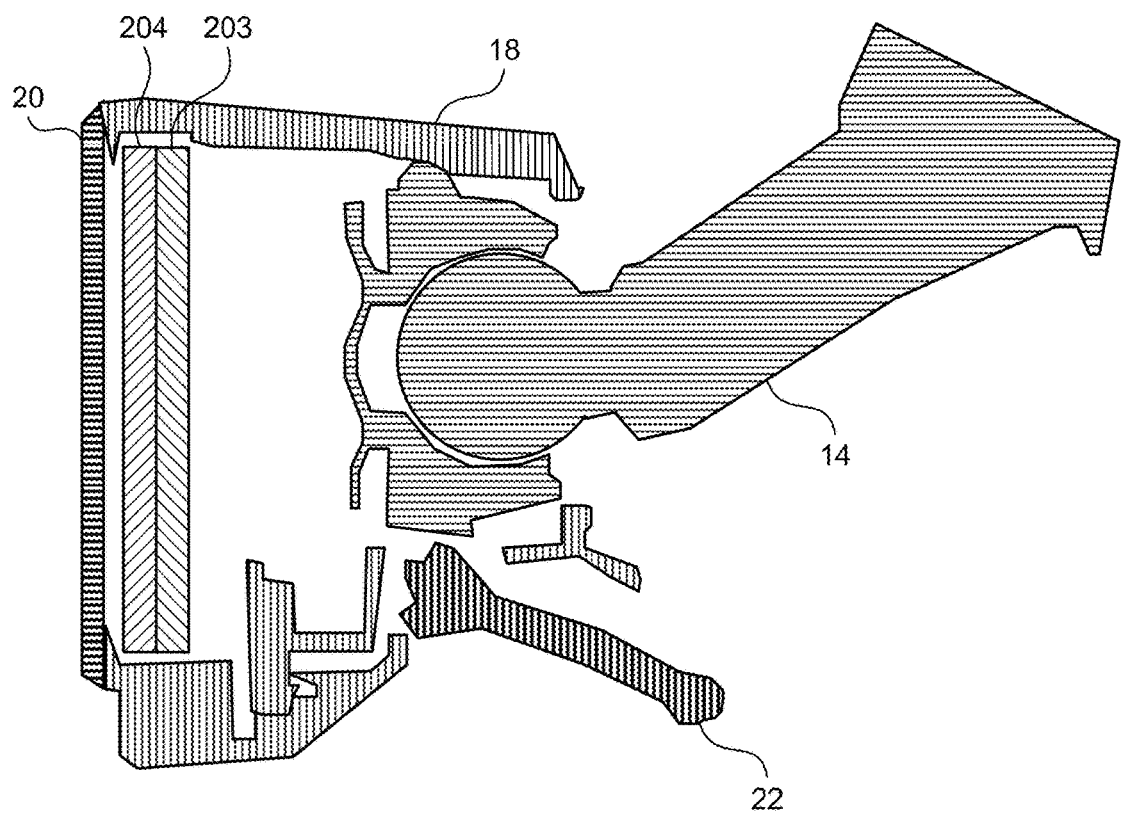
FIG. 5 is a cross-sectional view illustrating the structure when the display device of one aspect of the first embodiment of the present disclosure is in the second posture.
Figure 6:
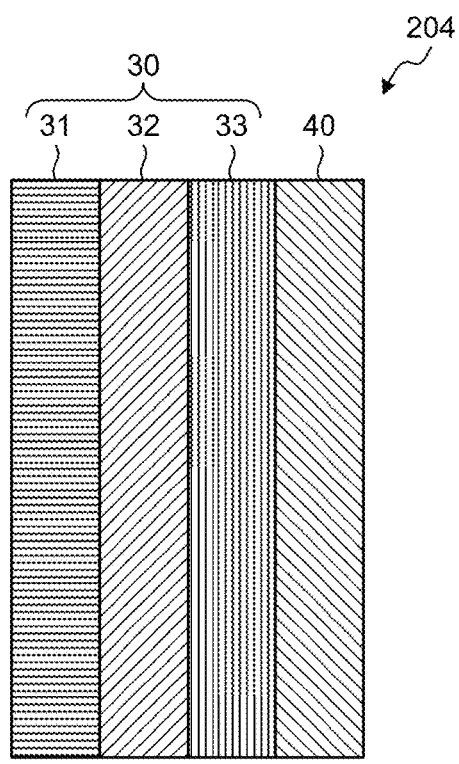
FIG. 6 is an overall view of the electro-optic layer relating to one aspect of the first embodiment of the present disclosure.

The position modes for the display device 200 of the present disclosure are described in detail while referring to FIGS. 2 through 6. FIG. 2 is a perspective view illustrating the structure of the display device 200 relating to one aspect of the embodiment of the present disclosure. FIG. 3 is a frontal view illustrating the overall structure of the display device 200 relating to one aspect of the embodiment of the present disclosure. FIG. 4 is a cross-sectional view illustrating the structure of the display device 200 when the electro-optic layer relating to one aspect of the embodiment of the present disclosure is in the first posture. FIG. 5 is a cross-sectional view illustrating the structure of the display device 200 when the electro-optic layer relating to one aspect of the embodiment of the present disclosure is in the second posture. FIG. 6 is a drawing illustrating the overall of the electro-optic layer relating to one aspect of the embodiment of the present disclosure.

FIGS. 4 and 5 illustrate the cross-sectional views taken along lines A-A' for each posture in FIG. 3. To simplify the description, the structure such as the later described base 10, mount 12, and bracket 14 for clamping the display device 200 to the windshield 500 are omitted from FIG. 3. To simplify the description, a description of various types of wiring and circuit boards placed within the display device 200 are omitted in the cross-sectional views of FIGS. 4 and 5. Various types of wiring and circuit boards may be placed inside the display device 200 as needed when mounting the display device 200 of the present disclosure.

The display device 200 includes a base 10, a mount 12, a bracket 14, a connector plate 16, a housing 18, a glass panel 20, an actuator 22, a first illuminance sensor 300, a second illuminance sensor 400, a display 203, and an electro-optic layer 204. The above described first illuminance sensor 300 and the second illuminance sensor 400 need not be placed within the display device 200.

The base 10 has a plate shape and is formed from hard material such as metal, etc. The surface of the base 10 that faces upward may for example be clamped to the windshield 500 by using adhesive, etc. Besides this arrangement, any method for clamping the display device 200 may be utilized if the same position as the conventional room mirror. The clamping strength when clamping the base 10, shall be to an extent that prevents the base 10 from falling from the windshield 500 in the event of a collision or a sudden stop by the vehicle 1000 even when an external force is sustained due to impacts on the later described mount 12, bracket 14, connector plate 16, housing 18, glass panel 20. The base 10 may be a shape that is longer along the forward-rear direction than in the left-right direction.

The mount 12 is a shape capable of combining with and sliding along the base 10. The mount 12 is manufactured from alloys of aluminum, magnesium, and zinc. The mount 12 may be manufactured from alloys such as aluminum alloy of ADC, etc. The mount 12 may be further manufactured from glass filler or resin filler. The filler may be glass or carbon fibers at this time. This type of mount 12 is a rigid piece. A rigid piece signifies an object that does not deform when the mount 12 is slide-combined on the base 10.

The bracket 14 is connected to the lower section of the mount 12. The bracket 14 extends downward from the mount 12 while forming a curve and connects to the rear surface of the housing 18. A connection plate 16 with a curved contour is placed on the section connecting with the bracket 14 on the rear side of the housing 18. The connection of the mount 12 and the bracket 14, the connection of the bracket 14 and the housing 18, the structure of the bracket 14, and the structure of the connection plate 16 utilize technology of the known art, so that a description is omitted here.

The bracket 14 and the connection plate 16 are for example manufactured from resin material. The bracket 14 and the mount 12, or the bracket 14 and mount piece 60 may be formed in an integrated piece. The bracket 14 may be manufactured from the same material as the mount 12 and at this time may be manufactured from a rigid piece the same as the mount 12.

The housing 18 has a box shape in the left and right directions and is supported by the bracket 14. The housing 18 has an opening 24 on the front side of the display device 200. A glass panel 20 is placed on the front side of the housing 18. The glass panel 20 may be placed so as to protect the display 203 and the electro-optic layer 204.

The actuator 22 includes a structure capable of switching between a first posture and a second posture of the electro-optic layer 204. The actuator 22 may for example have a lever shape. In that case, switching the position of the actuator 22 including the lever shape changes the tilt of the housing 18, so that the posture of the electro-optic layer 204 switches between the first posture and the second posture.

The actuator 22 is not limited to a lever shape and may for example have a button shape and any structure may be employed as long as the posture of the display device 200 can be switched between a first posture and a second posture. In the example in FIGS. 4 and 5, the actuator 22 changes the tilt of the housing 18 to switch the posture of the electro-optic layer 204 placed within the housing 18. However, the actuator 22 may have a structure that switches the posture of the electro-optic layer 204 without changing the tilt of the housing 18. In that case, the actuator 22 may physically connect with the electro-optic layer 204 and directly switch the posture of the electro-optic layer 204.

The first illuminance sensor 300 detects the brightness around the vehicle 1000. In the present embodiment, the first illuminance sensor 300 is placed on the rear surface of the housing 18 and detects the brightness around the vehicle 1000 by detecting the light after transmitting through the windshield 500. The second illuminance sensor 400 detects the intensity of the light emitting onto the front side of the display device 200. In the present embodiment, the second illuminance sensor 400 is placed on the front side of the housing 18 and detects the light emitted onto the electro-optic layer 204. The glass panel 20 may be placed on the front side of the second illuminance sensor 400.

The display 203 displays the captured video or images captured by the image capture device 100. The display 203 is for example a liquid crystal display or an electro-luminescent (EL) display.

The electro-optic layer 204 includes a transmissive-reflective layer 40 and a variable transmittance element 30. The transmissive-reflective layer 40 transmits a portion of the incident light and reflects another portion of the incident light. The transmissive-reflective layer 40 is for example a one-way mirror. The transmissive-reflective layer 40 may be placed on the rear surface of the variable transmittance element 30. The driver can visually recognize a mirror image such as images rearward of the vehicle appearing on the transmissive-reflective layer 40. Voltage can be applied to the variable transmittance element 30. The transmittance of the variable transmittance element 30 can be changed by controlling the voltage applied to the variable transmittance element 30. The amount of incident light from the variable transmittance element 30 on the transmissive-reflective layer 40 can in this way be increased or decreased. As a result, the reflectivity of the electro-optic layer 204 can be changed. The electro-optic layer 204 is described below in detail. The electro-optic layer 204 is visible from the front side of the display device 200 through the opening 24 of the housing 18.

The display 203 and the electro-optic layer 204 are each placed within the housing 18. The display 203 is placed on the rear side of the electro-optic layer 204. The electro-optic layer 204 is, in other words, placed on the front surface of the display 203. When the driver views rearward of the vehicle by using the display 203, the video or the image displayed on the display 203 is visible to the driver through the electro-optic layer 204. Also the display 203 does not display video or images when the driver is viewing rearward of the vehicle 1000 by way of the mirror image on the transmissive-reflective layer 40.

When the display 203 is not displaying images, or when a black image is displayed across the entire screen, the display 203 is not visible to the driver through the electro-optic layer 204. The incident light is at this time reflected by the transmissive-reflective layer 40 of the electro-optic layer 204 so that the driver can view rearward of the vehicle 1000 by way of the mirror image that is projected on the transmissive-reflective layer 40.

The switching of the posture of the electro-optic layer 204 and each posture are described while referring to FIGS. 4 and 5. FIG. 4 illustrates the case of the first posture of the electro-optic layer 204. FIG. 5 illustrates the case of the second posture of the electro-optic layer 204.

The first posture is the posture that the driver views rearward of the vehicle by utilizing the display 203. The second posture is the posture that the driver views rearward of the vehicle 1000 by utilizing the mirror image in the transmissive-reflective layer 40. As illustrated in FIGS. 4 and 5, the vehicle occupant 520 changes the tilt of the housing 18 by switching the position of the actuator 22 to switch the posture of the electro-optic layer 204. Specifically, by operating the actuator 22 to move the display device 200 forward or in other words, operating it to so as to approach near to the driver, the electro-optic layer 204 is switched to the first posture. On the other hand, by operating the actuator 22 to move the display device 200 rearward or in other words, away from the driver, the electro-optic layer 204 is switched to the second posture.

Comparing the first posture and the second posture, the second posture turns the normal line direction of the electro-optic layer 204 more upward relative to the driver than the first posture does. When in the second posture, the ceiling of the vehicle compartment is projected on the transmissive-reflective layer 40 of the electro-optic layer 204 as seen by the driver. The reflected light (also called ambient light) reflected from the transmissive-reflective layer 40 that is incident on the driver can therefore be reduced. Therefore, when the driver is viewing rearward of the vehicle by using the display 203, the ceiling of the vehicle compartment can be projected on the transmissive-reflective layer 40 within the electro-optic layer 204 by putting the electro-optic layer 204 in the second posture, so that bright ambient light such as headlights from rearward of the vehicle 1000 can be prevented from interfering with the driver's vision. Accordingly, the visual recognition of the video or images displayed on the display 203 can be improved.

Here, the drawings illustrate the display 203 and the electro-optic layer 204 placed in parallel with each other, however the display 203 and the electro-optic layer 204 may be placed so as to have a predetermined angle. For example, the normal line direction of the electro-optic layer 204 may be turned upward relative to the driver, compared to the normal line direction of the display 203.

One example of the electro-optic layer 204 is described while referring to FIG. 6. The electro-optic layer 204 includes the transmissive-reflective layer 40 and the variable transmittance element 30. The transmissive-reflective layer 40 has a structure that transmits a portion of the incident light and reflects another portion of the incident light. The transmissive-reflective layer 40 may for example be a one-way mirror having a transmittance of 50% and a reflectivity of 50% for the incident light. The transmissive-reflective layer 40 may be a polarized reflector plate that transmits a first polarized light, and reflects a second polarized light whose polarization direction is different from the first polarized light.

The variable transmittance element 30 includes for example a first electrode 31, an electrochromic layer 32, and a second electrode 33. The first electrode 31 and the second electrode 33 may be coupled to a power source not illustrated in the drawing. Transparent electrodes may be utilized for each of the first electrode 31 and the second electrode 33. Here, the transmittance of the electrochromic layer 32 can be varied by applying a voltage to the first electrode 31 and the second electrode 33. For example, the electrochromic layer 32 can have an incident light transmittance of 80% or more when no voltage is applied. The electrochromic layer 32 can have an incident light transmittance of 50% or less when a voltage is applied. The electrochromic layer 32 is not limited to these values, and for example the transmittance of the electrochromic layer 32 may be reduced when a voltage is applied compared to when no voltage is applied. Technology of the known art may be utilized for the electrochromic layer 32, so that a detailed description is omitted.

When the transmittance of the electrochromic layer 32 is in a low state, there is little incident light on the transmissive-reflective layer 40, so that the amount of light that the electro-optic layer 204 reflects is smaller compared to when the transmittance of the electrochromic layer 32 is in a high state. Therefore, by controlling the transmittance of the electrochromic layer 32, a large quantity of bright ambient light from the behind the vehicle 1000 can be prevented from shining into the eyes of the driver. In other words, by varying the transmittance of the electrochromic layer 32, the transmittance and reflectivity of the electro-optic layer 204 including the electrochromic layer 32 and the transmissive-reflective layer 40 can be varied.

Figure 7:
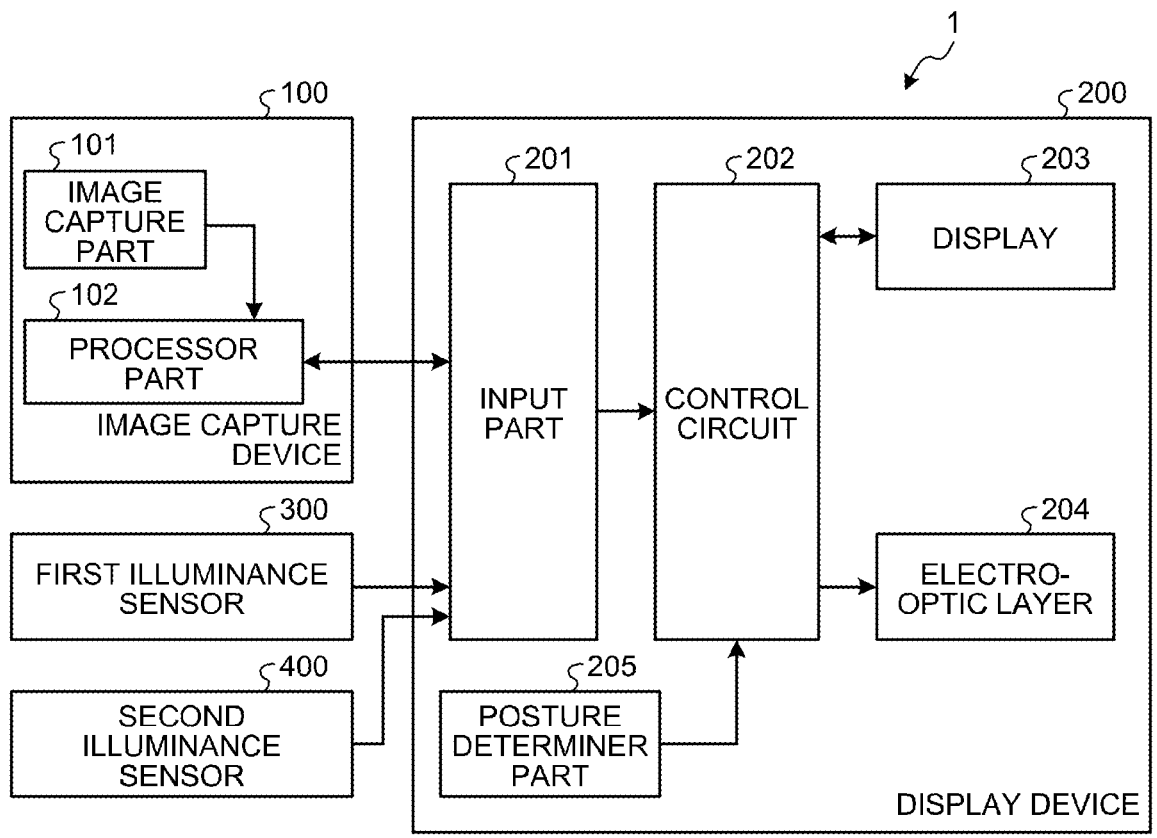
FIG. 7 is a block diagram illustrating the display system relating to one aspect of the first embodiment of the present disclosure.

FIG. 7 is a block diagram illustrating the display system 1 relating to one aspect of the embodiment of the present disclosure. The display system 1 includes the image capture device 100, the display device 200, the first illuminance sensor 300, and the second illuminance sensor 400.

The image capture device 100 includes an image capture part 101 and a processor part 102. The image capture part 101 includes a solid-state image sensing device. The solid-state image capture device may for example utilize a complementary metal oxide semiconductor (CMOS) image sensor or charge coupled device (CCD) image sensor. The solid-state image capture device converts the incident light arriving via the lens into electrical video signals and outputs them to a signal processor circuit not illustrated in the drawing. The signal processor circuit performs signal processing such as A/D conversion and noise elimination on the video signal input from the solid-state image capture device and supplies the output to the processor part 102.

The processor part 102 is implemented by sharing the hardware resources and software resources, or by the hardware sources alone. A central processing unit (CPU), a read only memory (ROM), random access memory (RAM), a graphics processing unit (GPU), a digital signal processor (DSP), an application specific integrated circuit (ASIC), a field-programmable gate array (FGPA), and other LSI devices may be utilized as hardware resources. Programs such as firmware can also be utilized as software resources.

The processor part 102 is capable of performing all types of video processing such as gradation correction (gray level), color correction, and contour correction on the video signal or the image signal input from the image capture part 101. The processor part 102 compresses the video-processed video signal or the image based on a predetermined compression method and sends the compressed video signal or image signal to the display device 200.

The first illuminance sensor 300 detects the brightness around the vehicle 1000. The first illuminance sensor 300 may also for example be utilized to detect the brightness of the driving environment of the vehicle 1000. For example, the first illuminance sensor 300 may be utilized to detect whether the driving environment is day or night, or may be utilized for detecting whether the vehicle 1000 is driving in a tunnel. The first illuminance sensor 300 detects a first illuminance (hereafter named, "first sensor value") as a value expressing the brightness, and outputs the detected first sensor value to the display device 200.

The first illuminance sensor may for example be placed on the display device 200 or may be placed in the vehicle 1000. When the first illuminance sensor 300 is placed on the display device 200, it may be placed on the rear side of the display device 200. The image capture device 100 may also function as the first illuminance sensor 300. When the image capture device 100 also functions as the first illuminance sensor 300, the brightness around the vehicle 1000 may be detected based on the brightness of the video or images acquired by the image capture part 101 of the image capture device 100.

Here, when the brightness around the vehicle 1000 is detected based on the brightness of the video or images acquired by the image capture part 101, the processing may be performed by the processor part 102 or may be performed by a control circuit 202 of the display device 200 described below.

The location to place the first illuminance sensor 300 is not limited to the above described state and it may be placed at an optional location capable of detecting the brightness around the vehicle 1000. The first illuminance sensor 300 may also be a silicon photosensor.

The second illuminance sensor 400 detects the intensity of the light emitted onto the front surface of the display device 200. The second illuminance sensor 400 may for example be utilized to detect the high beam headlights emitted onto the vehicle 1000 from a vehicle to the rear. The second illuminance sensor 400 detects a second illuminance (hereafter named, "second sensor value") as a value expressing the intensity of light emitted onto the front side of the display device 200, and outputs the detected second sensor value to the display device 200.

The second illuminance sensor 400 may for example be placed on the display device 200, or may be placed in the vehicle 1000. When the second illuminance sensor 400 is placed on the display device 200, it may be placed on the front side of the display device 200, and may be placed so as to directly detect the intensity of the light emitted onto the front surface of the display device 200.

When the second illuminance sensor 400 is placed in the vehicle 1000, it may be placed in the rear of the vehicle 1000, so as to detect the intensity of the light emitted onto the vehicle 1000 from the rear of the vehicle 1000. At this time, the light emitted onto the vehicle 1000 from the rear of the vehicle 1000 transmits through the glass on the rear of the vehicle 1000 and is emitted on the front side of the display device 200. Therefore, a value expressing the intensity of the detected light can be utilized as a value expressing the intensity of the light emitted onto the front surface of the display device 200, even when the second illuminance sensor 400 placed within the vehicle 1000 is utilized. The image capture device 100 may also function as the second illuminance sensor 400. When the image capture device 100 also functions as the second illuminance sensor 400, the intensity of the light emitted onto the front surface of the display device 200 can also be detected based on the brightness of the video or images acquired by the image capture part 101 of the image capture device 100.

Here, when the intensity of the light emitted onto the front surface of the display device 200 is detected based on the brightness of the video or image acquired by the image capture part 101, that processing may be performed by the processor part 102 or may be performed by the control circuit 202 of the display device 200 described below.

The location to place the first illuminance sensor 300 is not limited to the above described state and it may be placed at an optional location capable of detecting the brightness around the vehicle 1000. The first illuminance sensor 300 may also be a silicon photosensor.

The display device 200 includes an input part 201, the control circuit 202, the display 203, the electro-optic layer 204, and a posture determiner part 205.

The input part 201 is an interface that inputs the video signals or image signals output from the processor part 102 of the image capture device 100, the value output from the first illuminance sensor 300, and the value output from the second illuminance sensor 400 to the display device 200. The display device 200 may include different input parts 201 for the processor part 102, the first illuminance sensor 300, and the second illuminance sensor 400.

The control circuit 202 processes the video signal or the image signal from the image capture device 100, the value from the first illuminance sensor 300, the value from the second illuminance sensor 400, and the signal received from the posture determiner part 205. The control circuit 202 controls the operation of the display 203 and the electro-optic layer 204 according to the processing of these signals or values. Details of the process implemented by the control circuit 202 are described below. The control circuit 202 is implemented by sharing the hardware resources and the software resources, or by the hardware sources alone. The CPU, ROM, RAM, GPU, DSP, ASIC, FPGA, and other LSI devices may be utilized as hardware resources. Programs such as firmware can also be utilized as software resources.

The display 203 displays the video or the image based on the video data or the image data output from the control circuit 202.

The transmittance or reflectivity for incident light on the electro-optic layer 204 is changed by controlling the applied voltage by the control circuit 202. As stated previously, the electro-optic layer 204 includes the transmissive-reflective layer 40 and the variable transmittance element 30.

The posture determiner part 205 determines whether the posture of the electro-optic layer 204 is in the first posture or the second posture. The posture determiner part 205 inputs a signal indicating the posture of the electro-optic layer 204 to the control circuit 202.

The posture determiner part 205 may determine the posture of the electro-optic layer 204 by utilizing a gyro sensor, etc. The posture determiner part 205 may determine the posture of the electro-optic layer 204 by detecting whether the actuator 22 has been operated. At this time, a switch not illustrated in the drawing may be placed that is linked with the operation of the actuator 22, and the posture determiner part 205 may determine the posture of the electro-optic layer 204 by whether the switch is on or off.

Figure 8:
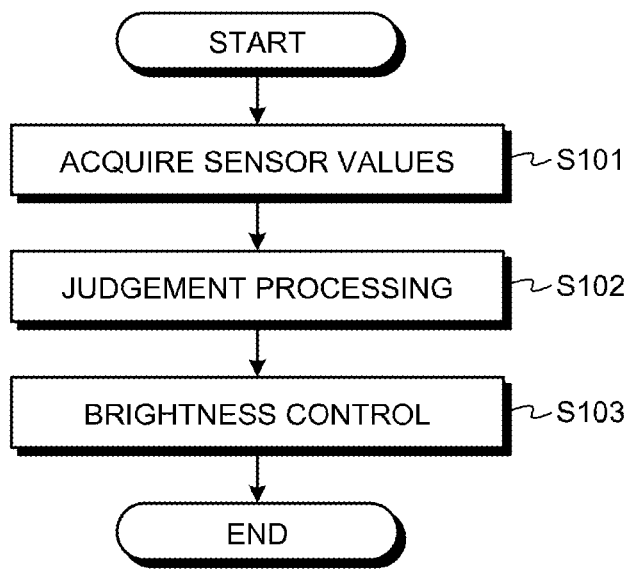
FIG. 8 is a flowchart illustrating the brightness control of the display device relating to one aspect of the first embodiment of the present disclosure.

The processing implemented by the control circuit 202 is described next while referring to FIG. 8 through FIG. 12. FIG. 8 is a flowchart illustrating the brightness control of the display device 200 relating to one aspect of the embodiment of the present disclosure.

The control circuit 202 controls the brightness of the video or images displayed on the display 203 based on the first sensor value acquired from the first illuminance sensor 300 or the second sensor value acquired from the second illuminance sensor 400. Here, for purposes of convenience, the control of the brightness is called the brightness control. The brightness control of the video or image may be implemented by changing the intensity of the backlight for the display 203 not illustrated in the drawing.

In step S101, the control circuit 202 acquires the respective first sensor value and second sensor value from the first illuminance sensor 300 and the second illuminance sensor 400. In step S102, the control circuit 202 implements judgement processing for how to execute brightness control based on the acquired first sensor value and second sensor value. A specific description is given while referring to FIG. 9.

Figures 9, 10:
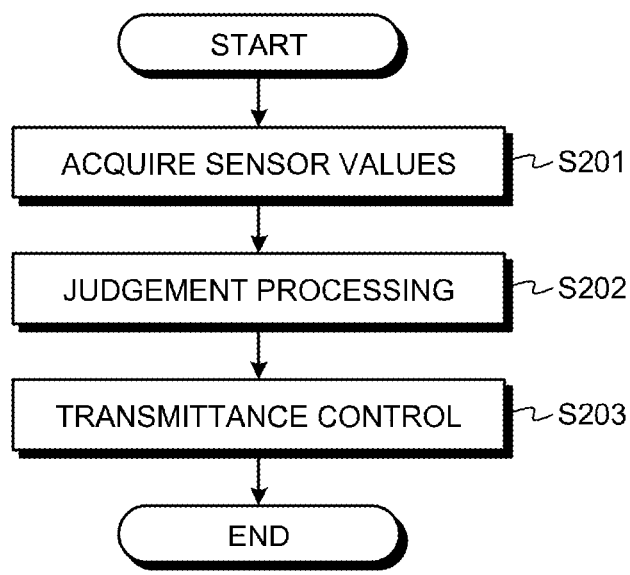
FIG. 9 is a drawing illustrating the judgment criteria in the judgment processing for the brightness control.
FIG. 10 is a flowchart illustrating the light transmittance control of the display device relating to one aspect of the first embodiment of the present disclosure.

FIG. 9 is a drawing illustrating the judgment criteria in the judgment processing for the brightness control. Here, when the first sensor value is a first threshold value or larger, the first sensor value is expressed as "HIGH". When the first sensor value is smaller than the first threshold value, the first sensor value is expressed as "LOW". The first threshold value is an optional value. The first threshold value may for example be a value that is a standard for determining if the environment around the vehicle 1000 is bright or determining if the environment is dark by utilizing the first illuminance sensor 300.

When the second sensor value is a second threshold value or higher, the second sensor value is expressed as "HIGH". When the second sensor value is smaller than the second threshold value, the second sensor value is expressed as "LOW". The second threshold value is an optional value. The second threshold value may for example be a value that is a standard for determining whether light from headlights from a rearward vehicle are emitted onto the front surface of the display device 200 by utilizing the second illuminance sensor 400.

When the brightness of the display 203 is lower than a third threshold value, the brightness is expressed as "LOW". When the brightness of the display 203 is between the third threshold value and the fourth threshold value, the brightness is expressed as "MEDIUM". When the brightness of the display 203 is higher than a fourth threshold value, brightness is expressed as "HIGH". At this time, the third threshold value and the fourth threshold value are optional values. The third threshold value may for example be a value within a range of 200 to 800 ($cd/m^2$), and the fourth threshold value may for example be a value within a range of 1000 to 1500 ($cd/m^2$), however these threshold values are not limited to the above values.

In the judgement processing in step S102, when for example, the first sensor value is "LOW", and the second sensor value is "HIGH", the brightness of the display 203 is judged as "LOW". When the first sensor value is "LOW", and the second sensor value is "LOW", the brightness of the display 203 is judged as "MEDIUM". The explanation of the content for controlling the brightness of the display 203 is described based on both the first sensor value and the second sensor value, however the brightness of the display 203 may be controlled based on either one of the first sensor value or the second sensor value. The control circuit 202 includes a table expressing the judgement criteria illustrated in FIG. 9, and step S102 may be implemented based on the information in the table.

In step S103, the control circuit 202 outputs signals for performing brightness control to the display 203 based on the judgement processing executed in step S102. The display 203 changes the brightness of the video or images being displayed based on signals that are received.

The control circuit 202 in this way judges how to perform brightness control according to whether the first sensor value is a first threshold value or higher, and the second sensor value is a second threshold value or higher. In this way, the brightness control of the display device 200 can be implemented to match changes in the surrounding environment such as changes in the brightness around the vehicle 1000. Control can therefore be appropriately implemented to match the surrounding environment for visual recognition of video or images displayed on the display device 200.

The transmittance control of the display device 200 is described next. FIG. 10 is a flowchart illustrating the transmittance control of the display device 200 relating to one aspect of the embodiment of the present disclosure. The control circuit 202 controls the transmittance of the electrochromic layer 32 contained in the electro-optic layer 204 based on the first sensor value acquired from the first illuminance sensor 300 or the second sensor value acquired from the second illuminance sensor 400. As already described, the amount of incident light to the transmissive-reflective layer 40 is changed by controlling the transmittance of the electrochromic layer 32 that causes a resultant change in the reflectivity or transmittance of the electro-optic layer 204. The control of the transmittance of the electrochromic layer 32 is described here.

In step S201, the control circuit 202 acquires the respective first sensor value and second sensor value from the first illuminance sensor 300 and the second illuminance sensor 400. In step S202, judgement processing is performed regarding how to control the transmittance of the electrochromic layer 32 based on the acquired first sensor value and second sensor value. Specifically, a description is given while referring to FIG. 11.

Figures 11, 12:
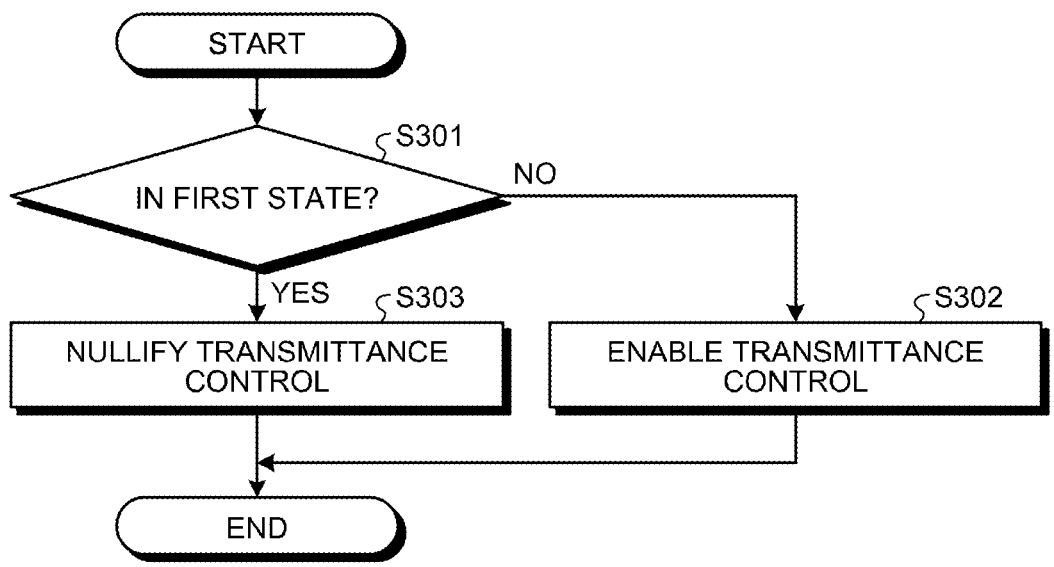
FIG. 11 is a drawing illustrating the judgment criteria in the judgment processing for the reflectivity control.
FIG. 12 is a flowchart illustrating the nullification processing for the light transmittance control for the display device relating to one aspect of the first embodiment of the present disclosure.

FIG. 11 is a drawing illustrating the judgment criteria in the judgment processing for the reflectivity control of the display device 200. The notation of "HIGH" or "LOW" for the first sensor value is the same as that for FIG. 9, so that a description is omitted. The notation of "HIGH" or "LOW" for the second sensor value is the same as that for FIG. 9, so that a description is omitted.

When the transmittance of the electrochromic layer 32 is lower than the fifth threshold value, the transmittance is expressed as "LOW". When the transmittance of the electrochromic layer 32 is between the fifth threshold value and the sixth threshold value, the transmittance is expressed as "MEDIUM". When the transmittance of the electrochromic layer 32 is the sixth threshold value or larger, the transmittance is expressed as "HIGH". The fifth threshold value and the sixth threshold value are optional values. The fifth threshold value may for example be a value in a range from 20% to 50%. The sixth threshold value may for example be a value in a range from 60% to 808. However, these threshold values are not limited to these values.

In the judgement processing in step S202, when for example the first sensor value is "LOW", and the second sensor value is "HIGH", the transmittance of the electrochromic layer 32 is judged as "HIGH". When the first sensor value is "LOW" and the second sensor value is "LOW", the transmittance of the electrochromic layer 32 is judged as "MEDIUM". The explanation of the content for controlling the transmittance of the electrochromic layer 32 is described based on both the first sensor value and the second sensor value, however the transmittance of the electrochromic layer 32 may be controlled based on either one of the first sensor value or the second sensor value. The control circuit 202 includes a table expressing the judgement criteria as illustrated in FIG. 11, and step S202 may be implemented based on the table.

In step S203, the control circuit 202 outputs a signal that controls the transmittance of the electrochromic layer 32 to the electro-optic layer 204 based on the judgement processing executed in step S202. Specifically, a signal that controls the voltage applied to the first electrode 31 and the second electrode 33 may be utilized. The electro-optic layer 204 changes the transmittance of the electrochromic layer 32 based on the received signal.

The process for the control circuit 202 to nullify the transmittance control of the electrochromic layer 32 is described next. FIG. 12 is a flowchart illustrating the nullification processing for the transmittance control for the display device 200 relating to one aspect of the embodiment of the present disclosure. In step S301, the control circuit 202 judges whether the electro-optic layer 204 or the display device 200 is in the first posture based on information expressing the posture of the electro-optic layer 204 or the display device 200 that is received from the posture determiner part 205. When judged as in the first posture, the process proceeds to step S303 and the transmittance control of the electrochromic layer 32 is nullified.

Specifically, the transmittance of the electrochromic layer 32 is clamped at a predetermined value and without implementing transmittance control of the electrochromic layer 32 based on the first sensor value or the second sensor value. Here, even when judged that changing the transmittance of the electrochromic layer 32 by the control circuit 202 is necessary in compliance with the transmittance control flow illustrated in FIG. 10, the control circuit 202 does not output a signal for controlling the transmittance to the electro-optic layer 204. Alternatively, the transmittance control flow as illustrated in FIG. 10 is set not to be performed.

When the transmittance control has been nullified, the transmittance of the electrochromic layer 32 is preferably clamped at a high value. For example, the transmittance may be clamped as a value of 80% or more.

In step S301, the first posture is not available or in other words when judged that this is the second posture, the process proceeds to step S302, and transmittance control of the electrochromic layer 32 is enabled. When the transmittance control is enabled, the control circuit 202 sets the transmittance control of the electrochromic layer 32 to enable based on the first sensor value or the second sensor value. The transmittance control is in other words implemented as illustrated in FIG. 10.

When the driver of the vehicle 1000 is viewing rearward of the vehicle 1000 by way of the video or the image displayed on the display 203 by way of this type of control, or in other words, when the electro-optic layer 204 is in the first posture, the control by the control circuit 202 nullifies the transmittance control of the electrochromic layer 32. By changing the transmittance of the electrochromic layer 32 in this way, the light output from the display 203 can be prevented from attenuating when transmitting through the electro-optic layer 204. In this way, visual recognition of the video or the image displayed on the display 203 can be ensured.

When the driver of the vehicle 1000 is on the other hand, viewing rearward of the vehicle 1000 by way of a mirror image that appears on the transmissive-reflective layer 40, or in other words when the electro-optic layer 204 is in the second posture, the transmittance control of the electrochromic layer 32 by the control circuit 202 is enabled. Therefore, when in circumstances where a large amount of bright incident ambient light is shining into the eyes of the driver from rearward of the vehicle 1000 such as from headlights of a rearward vehicle, transmittance control of the electrochromic layer 32 is implemented that can control the reflectivity of the electro-optic layer 204. Therefore, most of the incident light that is bright ambient light from rearward of the vehicle 1000 can be prevented from getting into the eyes of the driver. At this time, the transmittance of the electrochromic layer 32 may be controlled so as to reduce the reflectivity of the electro-optic layer.

Second Embodiment

Another embodiment of a display device and a display system relating to the present disclosure is therefore described. In the accompanying work drawings, in structures identical to the first embodiment, the same reference numerals are assigned to identical structural elements, descriptions are omitted, and the description centers on points different from the first embodiment.

Figure 13:
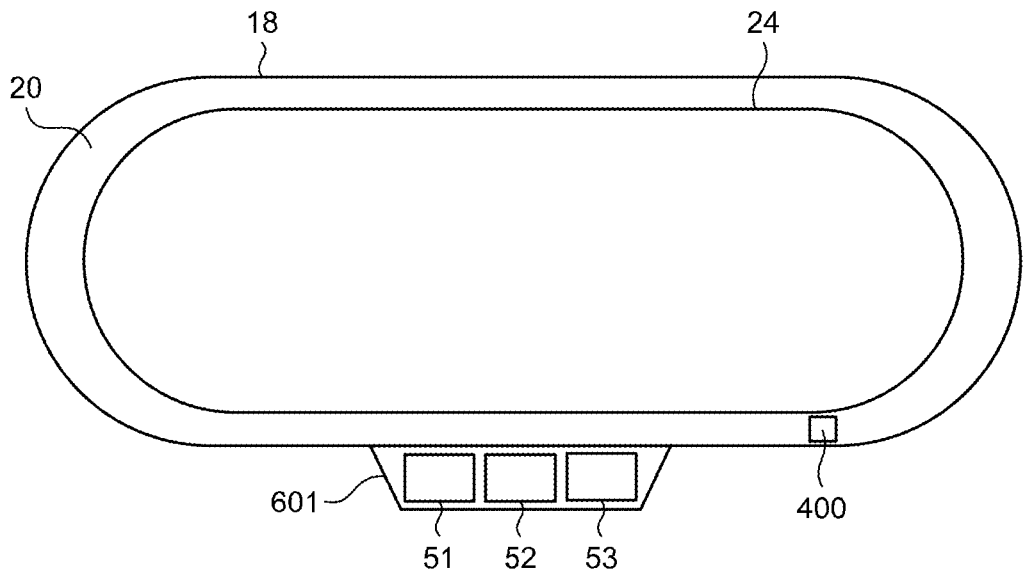
FIG. 13 is a frontal view illustrating an overall structure of the display device relating to one aspect of the second embodiment of the present disclosure.

FIG. 13 is a frontal view illustrating an overall structure of the display device relating to the second embodiment of the present disclosure. The point different from the first embodiment is the contour of the shape of the opening 24 on the housing 18. In the example of the first embodiment, the shape of the opening 24 on the housing 18 is longitudinal, however in the second embodiment a portion of the opening 24 of the housing 18 is a curved shape. The shape of the opening 24 illustrated in FIG. 13 is one example and other shapes such as an oval shape or a laterally long diamond shape are possible.

The display 203 and the electro-optic layer 204 placed within the housing 18 may be partially formed in a curved shape the same as the opening 24 of the housing 18. In other words, the shape of the display 203 and the electro-optic layer 204 are designed so as to match the shape of the opening 24 of housing 18.

In the second embodiment, a display device 600 includes an operating part 601 on the front side. The operating part 601 includes an input button 51, an input button 52, and an input button 53. The number of the input buttons at this time may be one, or may be more than three, or may be optionally designed. The actuator 22 is not illustrated in FIG. 13, but the second embodiment may include the actuator 22 the same as in the first embodiment.

Figure 14:
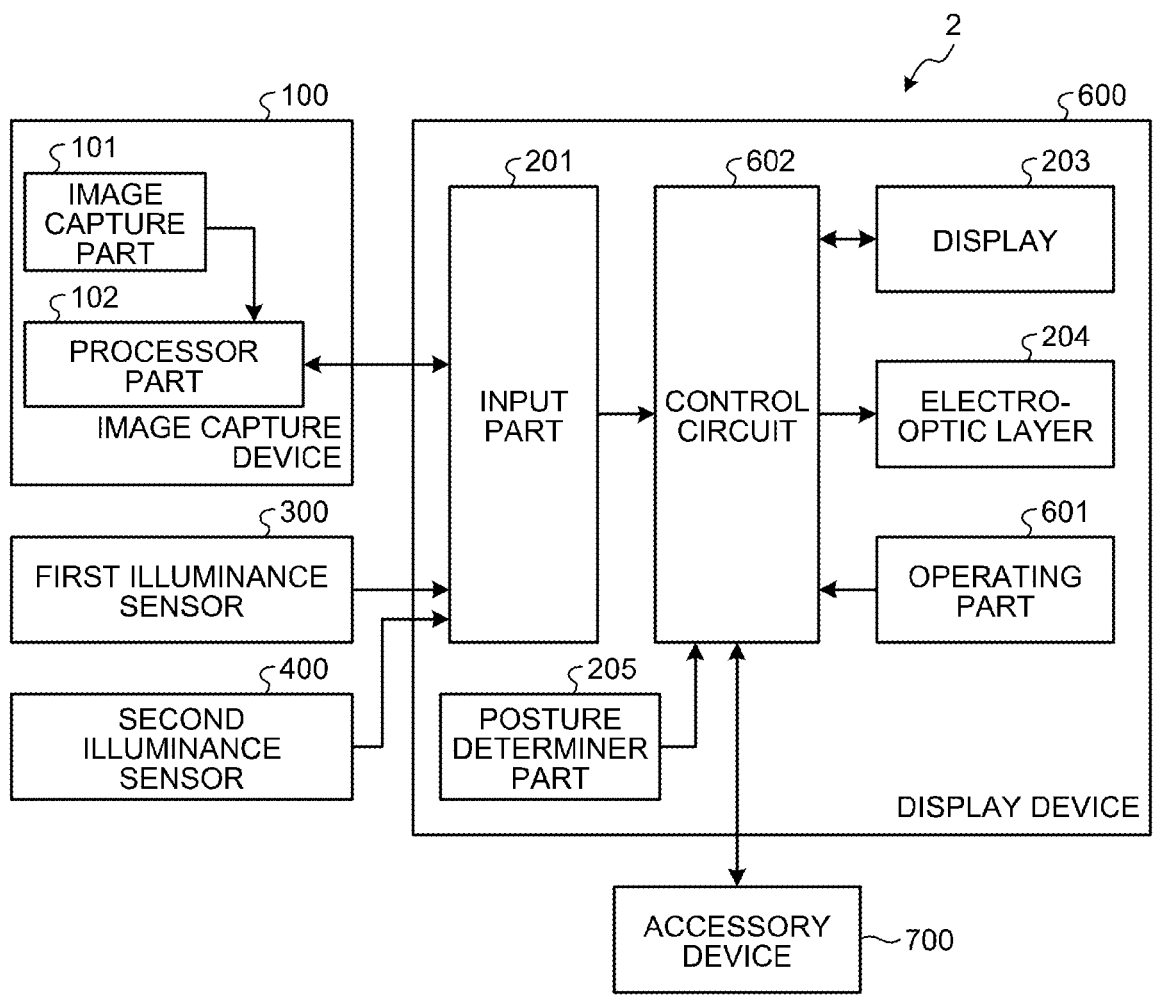
FIG. 14 is a block diagram illustrating the display system relating to one aspect of the second embodiment of the present disclosure.

FIG. 14 is a block diagram illustrating a display system 2 relating to the second embodiment of the present disclosure. The display system 2 includes an image capture device 100, a display device 600, a first illuminance sensor 300, a second illuminance sensor 400, and an accessory device 700.

The accessory device 700 is a device placed in the vehicle 1000 separate from the display device 600. The accessory device 700 may be all types of devices operable by the driver such as air conditioners that control the air conditioning within the vehicle, navigation devices, adjustment devices for adjusting the angle of the side mirrors, audio devices, and seat position adjuster devices for adjusting the seat angle and adjusting the seat forward-backward positions, etc. The accessory device 700 and the display device 600 may be coupled to allow communication such as over a network. The coupling at this time may utilize wireless communication, cable communication, and any combination of wireless and cable communication. The accessory device 700 may include a communication part for carrying out communication with the display device 600. The accessory device 700 may be a plurality of devices, and each of the accessory devices 700 may be coupled to the display device 600.

Compared with the first embodiment, the display device 600 further includes an operating part 601. The operating part 601 includes an input button 51, an input button 52, and an input button 53 capable of operating each function of the display device 600. Each function of the display device 600 may include functions for adjusting the brightness of the video displayed on the display 203, or functions for controlling the reflectivity or transmittance of the electro-optic layer 204. The number of input buttons may be one, may be more than three, or may be optionally designed. Also, each of the functions of the accessory device 700 coupled to the display device 600 may be operable by utilizing any of the input button 51, the input button 52, and the input button 53. The operating part 601 may input signals corresponding to each operation to the control circuit 602 based on operation of the input button 51, the input button 52, and the input button 53.

The accessory device 700 is operable by operating the operating part 601 of the display device 600, so that the vehicle occupant such as the driver can operate the accessory device 700 and the display device 600 from the same location within the vehicle.

The control circuit 602 of the display device 600 receives signals from the operating part 601. The control circuit 602 carries out communication with the accessory device 700 and transmits control signals to the accessory device 700. The control circuit 602 may receive all types of information such as information indicating the state of the accessory device 700 from the accessory device 700. The display device 600 may include a communication part for carrying out communication with the accessory device 700.

The control circuit 602 sends control signals for controlling each function to the accessory device 700, the display 203, and the electro-optic layer 204 based on signals that are received from the operating part 601.

The control circuit 602 displays video or images on the display 203 when the driver views rearward of the vehicle 1000 by way of the video or images displayed on the display 203. On the other hand, when the driver is viewing rearward of the vehicle 1000 by way of a mirror image appearing on the transmissive-reflective layer 40 contained in the electro-optic layer 204, the video or images are not displayed on the display 203. A black image may at this time be displayed on the display 203. The black image may be displayed across the entire area of the display 203. When video or images are displayed on the display 203, the driver can visually recognize them on the display 203 through the electro-optic layer. In other words, the driver can visually recognize the video or images. On the other hand, when video or images are not displayed on the display 203, or when the black image is displayed, the display 203 is not visible to the driver, and the mirror image appearing on the transmissive-reflective layer 40 contained in the electro-optic layer 204 is visible to the driver.

The control circuit 602 implements the process for trimming the video or images that are received from the image capture device 100. As already stated, the housing 18 of the display device 600 includes a curve-shaped opening 24, the driver visually recognizes video or images displayed on the display 203 through the opening 24. Therefore, the videos or images that the driver actually visually recognizes have the same contours as the opening 24. In the second embodiment, the shape of the display 203 is the same as the shape of the opening 24 or the housing 18. An image or a single frame of video acquired from the image capture device 100 is usually a square or a rectangular image, so that trimming of the video or image is performed to match the shape of the display 203. A specific description of the trimming processing is given below. Other operations of the control circuit 602 are the same as the first embodiment, so that a description is omitted.

Figure 15:
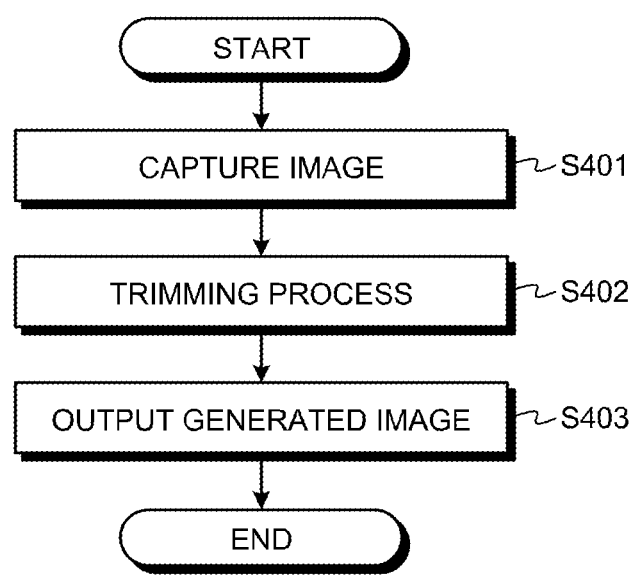
FIG. 15 is a flowchart illustrating the trimming processing for the display device relating to one aspect of the embodiment of the present disclosure.

FIG. 15 is a flowchart illustrating the trimming processing for the display device relating to one aspect of the embodiment of the present disclosure. In step S401, the control circuit 602 acquires video or images captured by the image capture device 100. In step S402, the trimming processing is performed and the acquired video or images, or video or images matched with the shape of the display 203 or the shape of the opening 24 are generated. Specifically, a portion of an area is cut out from the acquired video or images. The shape of the video or images that are cut out at this time are shapes that are identical to the shape of the display 203 or the opening 24.

The video or images generated through the trimming processing in S402 are output to the display 203 in step S403 and are displayed visible to the driver. This type of trimming processing is capable of generating video or images that match the shape of the display 203 or the opening 24 of the housing 18.

Contents of the present disclosure are described based on the embodiments. The embodiments are examples and one skilled in the art can understand that various modifications can be rendered by combining their structural elements or processes and that the modifications are within the scope of the present invention.

The display system of the embodiment of the present disclosure is a display system that is placeable in a vehicle, and the display system includes
- an image capture device that captures images rearward of the vehicle,
- a display device that is coupled to an image capture device via a network, and receives at least a portion of the rearward images captured by the image capture device,
- a first illuminance sensor that detects the brightness around the vehicle, and
- a second illuminance sensor that detects the intensity of the light emitted onto the front surface of the display device, in which
- the display device includes
- a housing with an opening on the front side,
- an electro-optic layer with a transmissive-reflective layer that transmits a portion of incident light and reflects another portion of the incident light, the electro-optic layer being configured to vary the reflectivity of the incident light,
- a display placed on the rear side of the electro-optic layer and configured to display at least a portion of the rearward image,
- a control circuit that controls the operation of the display device, and
- an actuator placed in the housing and configured to switch the posture of the electro-optic layer between a first posture and a second posture, in which
- the first posture is a posture that the driver of the vehicle views rearward of the vehicle by at least a portion of the rearward images displayed on the display,
- the second posture is a posture that the driver of the vehicle views rearward of the vehicle by a mirror image that appears on the transmissive-reflective layer, and
- the control circuit controls the display to display at least a portion of the rearward images when the posture of the electro-optic layer is in the first posture,
- controls the display to display no image when the posture of the electro-optic layer is in the second posture; and
- controls the brightness of the display based on a value detected by at least one of the first illuminance sensor and the second illuminance sensor, and
- the display is visible to the driver of the vehicle through the electro-optic layer when the control circuit controls the display to display at least a portion of the rearward images.

In the display system of one embodiment of the present disclosure, for example, the first illuminance sensor may be placed on the rear side of the housing, and the second illuminance sensor may be placed near the opening of the housing.

In the display system of one embodiment of the present disclosure, for example, the first illuminance sensor may be placed on the body of the vehicle, and the first illuminance sensor and the display device may be coupled via a vehicle network.

In the display system of one embodiment of the present disclosure, for example, the first illuminance sensor and the second illuminance sensor may include respective silicon photosensors.

In the display system of one embodiment of the present disclosure, for example, the actuator may switch the posture of the electro-optic layer between the first posture and the second posture by changing the posture of the housing.

In the display system of one embodiment of the present disclosure, for example, the actuator is coupled to the electro-optic layer and may switch the posture of the electro-optic layer between the first posture and the second posture without changing the posture of the housing.

The display device of one embodiment of the present disclosure is a display device that is placeable in the vehicle, and the display device includes
- a housing with an opening on the front side,
- an image acquirer that acquires images rearward of the vehicle,
- a first illuminance detector that detects a first illuminance expressing the brightness around the vehicle,
- a second illuminance detector that detects a second illuminance expressing the intensity of the light emitted on the front surface of the display device,
- an electro-optic layer that includes a transmissive-reflective layer that transmits a portion of incident light and reflects another portion of the incident light, the electro-optic layer being configured to vary the reflectivity of the incident light,
- a display placed on the rear side of the electro-optic layer and configured to display at least a portion of the rearward image,
- a control circuit that controls the operation of the display device, and
- an actuator placed in the housing and configured to switch the posture of the electro-optic layer between a first posture and a second posture, in which
- the first posture is a posture that the driver of the vehicle views the rearward of the vehicle by at least a portion of the rearward images displayed on the display,
- the second posture is a posture that the driver of the vehicle views the rearward of the vehicle by a mirror image that appears on the transmissive-reflective layer,
- the control circuit
- controls the display to display at least of a portion of the rearward images when the posture of the electro-optic layer is in the first posture,
- controls the display to display no image when the posture of the electro-optic layer is in the second posture; and
- controls the brightness of the display based on a value of at least one of the first illuminance and the second illuminance, and
- the display is visible to the driver of the vehicle through the electro-optic layer when the control circuit controls the display to display at least a portion of the rearward images.

In the display device of one embodiment of the present disclosure, for example, the actuator may switch the posture of the electro-optic layer between the first posture and the second posture by changing the posture of the housing.

In the display device of one embodiment of the present disclosure, for example, the actuator is coupled to the electro-optic layer and may switch the posture of the electro-optic layer between the first posture and the second posture without changing the posture of the housing.

The display system of one embodiment of the present disclosure is a display system that is placeable in a vehicle and the display system includes
- an image capture device that captures images rearward of the vehicle, a display device that is coupled to the image capture device over a network and receives at least a portion of the rearward images captured by the image capture device, a first illuminance sensor that detects the brightness around the vehicle, and a second illuminance sensor that detects the intensity of the light emitted onto the front surface of the display device, and the display device includes a housing with an opening on the front side, an electro-optic layer with a transmissive-reflective layer that transmits a portion of incident light and reflects another portion of the incident light, the electro-optic layer being configured to vary the reflectivity of the incident light, a display placed on the rear side of the electro-optic layer and configured to display at least a portion of the rearward image, a control circuit that controls the operation of the display device, an actuator placed in the housing and configured to switch the posture of the electro-optic layer between a first posture and a second posture, in which the first posture is a posture that the driver of the vehicle can view rearward of the vehicle by at least a portion of the rearward images displayed on the display, and the second posture is a posture that the driver of the vehicle can view rearward of the vehicle by a mirror image that appears on the transmissive-reflective layer, the control circuit controls the display to display at least of a portion of the rearward images when the posture of the electro-optic layer is in the first posture, controls the display to display no image when the posture of the electro-optic layer is in the second posture; and controls the reflectivity of the electro-optic layer based on the other value detected by at least one of the first illuminance sensor and the second illuminance sensor, and the display is visible to the driver of the vehicle by the electro-optic layer when the control circuit controls the display to display at least a portion of the rearward images.

In the display system of one embodiment of the present disclosure, for example, the control circuit may not control the reflectivity of the electro-optic layer when the display is controlled so as to display at least a portion of the rearward images.

In the display system of one embodiment of the present disclosure, for example, the first illuminance sensor may be placed on the rear side of the housing, and the second illuminance sensor may be placed near the opening of the housing.

In the display system of one embodiment of the present disclosure, for example, the first illuminance sensor may be placed on the body of the vehicle, and the illuminance sensor and the display device may be coupled via the vehicle network.

In the display system of one embodiment of the present disclosure, for example, the first illuminance sensor and the second illuminance sensor may include respective silicon photosensors.

In the display system of one embodiment of the present disclosure, for example, the actuator may switch the posture of the electro-optic layer between the first posture and the second posture by changing the posture of the housing.

In the display system of one embodiment of the present disclosure, for example, the actuator is coupled to the electro-optic layer, and may switch the posture of the electro-optic layer between the first posture and the second posture without changing the posture of the housing.

The display device of one embodiment of the present disclosure is a display device that is placeable in a vehicle, and the display device includes a housing with an opening on the front side, a first illuminance sensor that detects a first illuminance expressing the brightness around the vehicle, a second illuminance sensor that detects a second luminance expressing the intensity of the light emitted onto the front surface of the display device, an electro-optic layer with a transmissive-reflective layer that transmits a portion of incident light and reflects another portion of the incident light, the electro-optic layer being configured to vary the reflectivity of the incident light, a display placed on the rear side of the electro-optic layer and configured to display at least a portion of images rearward of the vehicle, a control circuit that controls the operation of the display device, and an actuator placed in the housing and configured to switch a posture of the electro-optic layer between a first posture and a second posture, in which the first posture is a posture that the driver of the vehicle can view rearward of the vehicle by at least a portion of the rearward images displayed on the display, the second posture is a posture that the driver can view rearward of the vehicle by a mirror image that appears on the transmissive-reflective layer, the control circuit controls the display to display at least of a portion of the rearward images when the posture of the electro-optic layer is in the first posture, controls the display to display no image when the posture of the electro-optic layer is in the second posture; and controls the reflectivity of the electro-optic layer based on a value of at least one of the first illuminance and the second illuminance, and the display is visible to the driver through the electro-optic layer when the control circuit controls the display to display at least a portion of the rearward images.

In the display device of one embodiment of the present disclosure, for example, the control circuit may not control the reflectivity of the electro-optic layer when the display is controlled to display at least a portion of the rearward images.

In the display device of one embodiment of the present disclosure, for example, the actuator may switch the posture of the electro-optic layer between the first posture and the second posture by changing the posture of the housing.

In the display system of one embodiment of the present disclosure, for example, the actuator is coupled to the electro-optic layer and may switch the posture of the electro-optic layer between the first posture and the second posture without changing the posture of the housing.

In the display device of one embodiment of the present disclosure, for example, the first illuminance sensor may be placed on the rear side of the housing, and the second illuminance sensor may be placed near the opening of the housing.

In the display device of one embodiment of the present disclosure, for example, the display may be coupled to the image capture device for capturing rearward images of the vehicle over a network.

In the display system of one embodiment of the present disclosure, for example, the first illuminance sensor and the second illuminance sensor may include respective silicon photosensors.

The display system of one embodiment of the present disclosure is a display system that is placeable in a vehicle, and the display system includes an accessory device, an image capture device that captures images rearward of the vehicle, a display device that is coupled to an image capture device and an accessory device via a network, and that receives at least a portion of the rearward images captured by the image capture device, the display device includes a housing with an opening on the front side, a transmissive-reflective layer that transmits a portion of incident light and reflects another portion of the incident light, a display placed on the rear side of the transmissive-reflective layer and that displays at least a portion of the rearward image, an operation part that receives input by the vehicle occupant, and a control circuit that controls the operation of the display device, the control circuit cuts out a portion of an area on the rearward image acquired by the image capture device, generates an image matching the shape of the opening, and outputs it to the display, outputs a control signal to the accessory device or the display when an input is received from the operating part, and the display is visible to the driver of the vehicle through the transmissive-reflective layer when the control circuit controls the display to display at least a portion of the rearward images.

The display system of one embodiment of the present disclosure, for example further includes an actuator placed on the housing and configured to switch the posture of the transmissive-reflective layer between a first posture and a second posture, the first posture may be a posture that the driver of the vehicle views the rearward of the vehicle by at least a portion of the rearward images displayed on the display, and the second posture may be a posture that the driver of the vehicle views the rearward of the vehicle by a mirror image that appears on the transmissive-reflective layer.

The display system of one embodiment of the present disclosure, for example further includes a first illuminance sensor that detects the brightness around the vehicle, a second illuminance sensor that detects the intensity of the light emitted onto the front side of the display device, and the control circuit may control the brightness of the display device based on a value detected by at least one from either of the first illuminance sensor or the second illuminance sensor.

In the display system of one embodiment of the present disclosure, for example, the first illuminance sensor is placed on the rear side of the housing, and the second illuminance sensor is placed near the opening in the housing.

In the display system of one embodiment of the present disclosure, for example, the first illuminance sensor is placed on the body of the vehicle, and the illuminance sensor and the display device may be coupled via a vehicle network.

In the display system of one embodiment of the present disclosure, for example, the first illuminance sensor and the second illuminance sensor may include respective silicon photosensors.

In the display system of one embodiment of the present disclosure, for example, the actuator may switch the posture of the electro-optic layer between the first posture and the second posture by changing the posture of the housing.

In the display system of one embodiment of the present disclosure, for example, the actuator is coupled to the electro-optic layer and may switch the posture of the electro-optic layer between the first posture and the second posture without changing the posture of the housing.

The display device of one embodiment of the present disclosure is a display device that is placeable in inside of the vehicle and that is coupled to an accessory device placed in the vehicle via a network, and the display device including, a housing with an opening on the front side, a transmissive-reflective layer that transmits a portion of incident light and reflects another portion of the incident light, a display placed on the rear side of the transmissive-reflective layer and that displays at least a portion of the rearward images of the vehicle, an operating part that receives the input by the vehicle occupant, and a control circuit that controls the operation of the display device, in which the control circuit cuts out a portion of an area on the rearward image acquired by the image capture device, generates an image matching the shape of the opening and outputs it to the display, and outputs a control signal to the accessory device or the display when the operating part receives an input, and the display is visible to the driver of the vehicle through the transmissive-reflective layer when the control circuit controls the display to display at least a portion of the rearward images.

A display device of one embodiment of the present disclosure, for example, further includes an actuator that is placed in the housing and switches the posture of the transmissive-reflective layer between a first posture and a second posture, in which the first posture may be a posture that the driver of the vehicle views rearward of the vehicle by at least a portion of the rearward images displayed on the display, and the second posture may be a posture that the driver of the vehicle views rearward of the vehicle by way of a mirror image that appears on the transmissive-reflective layer.

The display device of one embodiment of the present disclosure, for example, further includes
a first illuminance sensor that detects the brightness around the vehicle,
a second illuminance sensor that detects the intensity of the light emitted onto the front side of the display device, and
the control circuit may control the brightness of the display device based on a value detected by at least one from either of the first illuminance sensor or the second illuminance sensor.

The display device of one embodiment of the present disclosure, for example, further includes
the first illuminance sensor placed on the rear side of the housing, and
the second sensor placed near the opening of the housing.

In the display device of one embodiment of the present disclosure, for example,
the display device may be coupled to the image capture device that acquires images rearward of the vehicle via a network.

In the display device of one embodiment of the present disclosure, for example,
the first illuminance sensor and the second illuminance sensor may include respective silicon photosensors.

The display system and display device as described above are capable of rendering further improvements.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display device placeable within an interior of a vehicle, the display device comprising:
   a housing;
   an electro-optic layer configured to vary reflectivity of incident light, to transmit a portion of the incident light, and to reflect another portion of the incident light;
   a display configured to display at least a portion of a rearward image captured by an image capture device; and
   an actuator provided in the housing and configured to switch the electro-optic layer between a first posture and a second posture, wherein
   the display is configured to display at least the portion of the rearward image when the electro-optic layer is in the first posture,
   the reflectivity of the incident light varies between at least two values including a first value and a second value based on at least one of a first illuminance or a second illuminance when the electro-optic layer is in the second posture, the second value being larger than the first value,
   the reflectivity of the incident light is equal to or more than the second value when the electro-optic layer is in the first posture,
   the first illuminance indicates brightness around the vehicle and is detected by a first illuminance sensor, and
   the second illuminance indicates intensity of light emitted on a front surface of the display device and is detected by a second illuminance sensor.

2. The display device according to claim 1, wherein
   the electro-optic layer includes a transmissive-reflective layer,
   the first posture is a posture that a driver of the vehicle views rearward of the vehicle by at least the portion of the rearward image displayed on the display, and
   the second posture is a posture that the driver views rearward of the vehicle by way of a mirror image that appears on the transmissive-reflective layer.

3. The display device according to claim 1, wherein the actuator switches the electro-optic layer between the first posture and the second posture by changing a posture of the housing.

4. The display device according to claim 1, wherein the display is coupled to the image capture device that captures the rearward image via a network.

5. The display device according to claim 1, further comprising an electro-optic layer control circuit configured to control operation of the electro-optic layer, wherein
   the electro-optic layer control circuit controls the reflectivity of the electro-optic layer by varying a value of a voltage applied to the electro-optic layer when the electro-optic layer is in the second posture, and
   the electro-optic layer control circuit does not control the reflectivity of the electro-optic layer when the electro-optic layer is in the first posture.

6. The display device according to claim 5, wherein the electro-optic layer control circuit controls the reflectivity of the electro-optic layer to change between at least three values when the electro-optic layer is in the second posture.

7. The display device according to claim 1, wherein the electro-optic layer includes an electrochromic layer and a transmissive-reflective layer.

8. The display device according to claim 1, wherein the actuator is a lever.

9. The display device according to claim 1, wherein the display is configured to omit displaying the rearward image when the electro-optic layer is in the second posture.

10. The display device according to claim 1, wherein
    the reflectivity of the incident light is a first reflectivity when the following conditions are satisfied:
       the first illuminance is low, the second illuminance is high, and the electro-optic layer is in the second posture,
    the reflectivity of the incident light is a second reflectivity when the following conditions are satisfied:
       the first illuminance is high, the second illuminance is low, and the electro-optic layer is in the second posture, and
    the second reflectivity is lower than the first reflectivity.

11. A display system that is placeable in a vehicle, the display system comprising:
    an image capture device that captures a rearward image of the vehicle;
    a display device that is coupled to the image capture device, and receives at least a portion of the rearward image captured by the image capture device; and
    a first illuminance sensor and a second illuminance sensor,
    wherein the display device includes:
    a housing;

an electro-optic layer configured to vary reflectivity of incident light, to transmit a portion of the incident light, and to reflect another portion of the incident light;

a display configured to display at least the portion of the rearward image; and an actuator provided in the housing and configured to switch the electro-optic layer between a first posture and a second posture, wherein the display is configured to display at least the portion of the rearward image when the electro-optic layer is in the first posture, the reflectivity of the incident light varies between at least two values including a first value and a second value based on at least one of a first illuminance or a second illuminance when the electro-optic layer is in the second posture, the second value being larger than the first value, the reflectivity of the incident light is equal to or more than the second value when the electro-optic layer is in the first posture, the first illuminance indicates brightness around the vehicle and is detected by the first illuminance sensor, and the second illuminance indicates intensity of light emitted on a front surface of the display device and is detected by the second illuminance sensor.

12. The display system according to claim 11, wherein the electro-optic layer includes a transmissive-reflective layer, the first posture is a posture that a driver of the vehicle views rearward of the vehicle by at least the portion of the rearward image displayed on the display, and the second posture is a posture that the driver views rearward of the vehicle by way of a mirror image that appears on the transmissive-reflective layer.

13. The display system according to claim 11, wherein the actuator switches the electro-optic layer between the first posture and the second posture by changing a posture of the housing.

14. The display system according to claim 11, wherein the first illuminance sensor is provided in a body of the vehicle, and the first illuminance sensor and the display device are coupled via a vehicle network.

15. The display system according to claim 11, further comprising an electro-optic layer control circuit configured to control operation of the electro-optic layer, wherein the electro-optic layer control circuit controls the reflectivity of the electro-optic layer by varying a value of a voltage applied to the electro-optic layer when the electro-optic layer is in the second posture, and the electro-optic layer control circuit does not control the reflectivity of the electro-optic layer when the electro-optic layer is in the first posture.

16. The display system according to claim 15, wherein the electro-optic layer control circuit controls the reflectivity of the electro-optic layer to change between at least three values when the electro-optic layer is in the second posture.

17. The display system according to claim 11, wherein the electro-optic layer includes an electrochromic layer and a transmissive-reflective layer.

18. The display system according to claim 11, wherein the actuator is a lever.

19. The display system according to claim 11, wherein the display is configured to omit displaying the rearward image when the electro-optic layer is in the second posture.

20. The display system according to claim 11, wherein the reflectivity of the incident light is a first reflectivity when the following conditions are satisfied:

the first illuminance is low, the second illuminance is high, and the electro-optic layer is in the second posture, the reflectivity of the incident light is a second reflectivity when the following conditions are satisfied:

the first illuminance is high, the second illuminance is low, and the electro-optic layer is in the second posture, and the second reflectivity is lower than the first reflectivity.

* * * * *